United States Patent
Chavez et al.

(10) Patent No.: US 10,878,819 B1
(45) Date of Patent: Dec. 29, 2020

(54) SYSTEM AND METHOD FOR ENABLING REAL-TIME CAPTIONING FOR THE HEARING IMPAIRED VIA AUGMENTED REALITY

(71) Applicant: UIPCO, LLC, San Antonio, TX (US)

(72) Inventors: Carlos Chavez, San Antonio, TX (US); Martha Rodriguez Hathorn, San Antonio, TX (US); Emily Kathleen Krebs, San Antonio, TX (US); Ashley Raine Philbrick, San Antonio, TX (US); Sarah Van Auken Shaw, Helotes, TX (US)

(73) Assignee: UNITED SERVICES AUTOMOBILE ASSOCIATION (USAA), San Antonio, TX (US)

(*) Notice: Subject to any disclaimer, the term of this patent is extended or adjusted under 35 U.S.C. 154(b) by 0 days.

(21) Appl. No.: 15/962,135

(22) Filed: Apr. 25, 2018

Related U.S. Application Data (60) Provisional application No. 62/489,733, filed on Apr. 25, 2017.

(51) Int. Cl.
| | | |
|---|---|---|
| *G10L 15/26* | (2006.01) | |
| *G06F 3/16* | (2006.01) | |
| *G06K 9/00* | (2006.01) | |
| *G06F 3/01* | (2006.01) | |
| *G10L 21/10* | (2013.01) | |
| *G10L 15/25* | (2013.01) | |
| *G06T 19/00* | (2011.01) | |
| *G06F 40/58* | (2020.01) | |
| *G10L 17/00* | (2013.01) | |

(52) U.S. Cl.
CPC .............. *G10L 15/26* (2013.01); *G06F 3/017* (2013.01); *G06F 3/167* (2013.01); *G06F 40/58* (2020.01); *G06K 9/00315* (2013.01); *G06T 19/006* (2013.01); *G10L 15/25* (2013.01); *G10L 17/00* (2013.01); *G10L 21/10* (2013.01)

(58) Field of Classification Search
USPC .......................... 704/235, 246, 247, 251, 252
See application file for complete search history.

(56) References Cited

U.S. PATENT DOCUMENTS

| | | | | |
|---|---|---|---|---|
| 6,240,392 | B1* | 5/2001 | Butnaru | G09B 21/009 |
| | | | | 704/271 |
| 2010/0222098 | A1* | 9/2010 | Garg | H04M 1/72552 |
| | | | | 455/556.1 |
| 2012/0215519 | A1* | 8/2012 | Park | G06F 17/289 |
| | | | | 704/2 |
| 2012/0329518 | A1* | 12/2012 | Garg | H04M 1/72552 |
| | | | | 455/556.1 |
| 2014/0129207 | A1* | 5/2014 | Bailey | G06F 17/289 |
| | | | | 704/2 |
| 2016/0295038 | A1* | 10/2016 | Rao | G06F 3/005 |

\* cited by examiner

*Primary Examiner* — Leonard Saint Cyr
(74) *Attorney, Agent, or Firm* — Brinks Gilson & Lione (57) ABSTRACT

A wearable device providing an augmented reality experience for the benefit of hearing impaired persons is disclosed. The augmented reality experience displays a virtual text caption box that includes text that has been translated from speech detected from surrounding speakers.

20 Claims, 7 Drawing Sheets

SYSTEM AND METHOD FOR ENABLING REAL-TIME CAPTIONING FOR THE HEARING IMPAIRED VIA AUGMENTED REALITY

CROSS-REFERENCE TO RELATED APPLICATION(S)

This application claims benefit to U.S. Provisional Patent Application No. 62/489,733, filed Apr. 25, 2017, the entirety of which is hereby incorporated by reference herein.

BACKGROUND

Hearing impairment can present difficulties for persons in settings where multiple speakers are involved. While lip reading may be utilized to understand speakers within a person's line of sight, such techniques require direct visual confirmation which become much less effective when multiple speakers are present. Visual confirmation techniques are also not possible when the speaker is outside a person's line of sight.

These and other difficulties that affect hearing impaired persons may be cured by a wearable device capable of presenting detected speech to the hearing impaired persons.

DESCRIPTION OF THE FIGURES

The present disclosure may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

The methods, devices, and systems discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

On their own, persons with hearing impairment are often times left struggling to keep up with conversations involving multiple speakers. While hearing aids and visual lip tracking techniques can provide some aid in understanding speakers, this task becomes much more difficult on the hearing impaired person when multiple speakers are present.

The present disclosure looks to provide a technical solution to this problem. The technical solution includes a wearable device, such as the headset 100 shown in FIG. 1, that monitors audible speech and displays captioned text on an augmented reality graphical user interface (ARGUI) that interprets the monitored audible speech. The headset 100 shown in FIG. 1 takes the form of a pair of wearable glasses including arm portions 101, a computing system 102, a display unit 103, a camera unit 104, lenses 105, and a multi-directional microphone 106. According to some embodiments, the display unit 103 may be integrated to replace parts, or all, of the lenses 105. According to some embodiments, the display unit 103 may be enlarged to overlap some, or all, of the lenses 105, so that an augmented reality virtual image may be displayed on the display unit 103 to be included within a field of view 140 of a wearer of the headset 100. In addition to the wearable glasses, the headset 100 may take the form of a headset to be worn or strapped around a user's head, and which includes a single uniform lens and/or an integrated display unit in place of the lenses 105.

Figure 1:
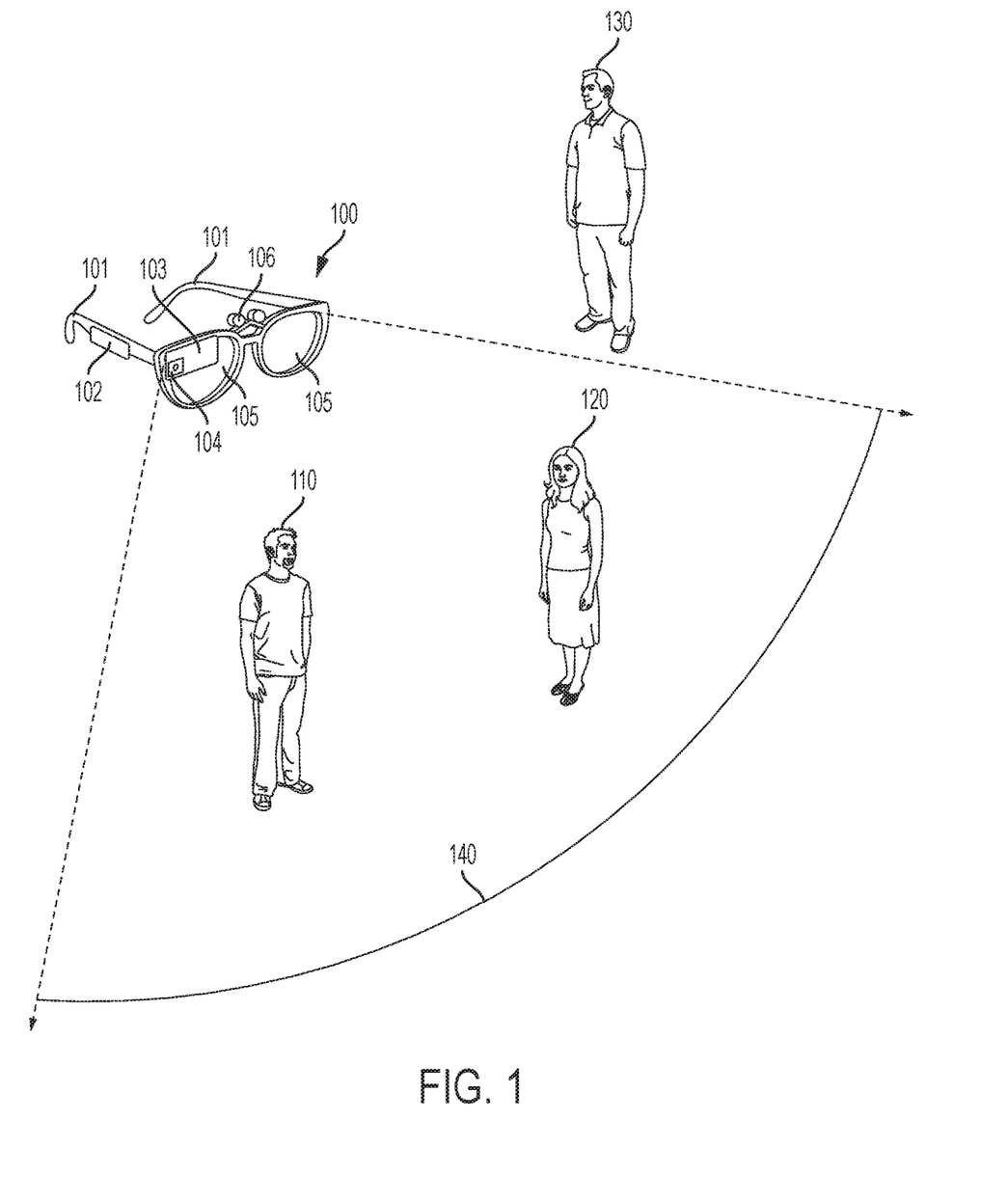
FIG. 1 illustrates an exemplary wearable device operating within a setting including multiple speakers.

In the wearable glasses format, the arm portions 101 wrap, at least in part, around the wearer's ears. The computing system 102 includes, for example, one or more components described by the computer architecture described for the computer 600 illustrated in FIG. 6. For example, the computing system 102 may include a memory configured to store instructions, a processor configured to execute the instructions stored on the memory to implement one or more processes described herein, a network interface for communicating with other electronic devices within a network, and one or more input devices such as a scroll wheel, button(s), or touchpad for receiving user inputs. The display unit 103 displays information within the wearer's field of view 140, so that the information is projected onto the wearer's field of view 140. This way, an augmented reality view that includes both physical objects and virtual information is presented to the wearer.

The lenses 105 may be prescription or non-prescription lenses made out of glass or a plastic based polymer, and allow the wearer to focus on objects within the wearer's field of view. Camera unit 104 may capture image data depicting a scene within the camera unit's 104 field of view. The image data captured by the camera unit 104 may include digital images and/or digital video. Digital images captured by the camera unit 104 may include most, if not all, of the wearer's field of view 140 through lenses 105. For example, camera unit 104 may capture digital images of a first speaker 110 and a second speaker 120 that are within the wearer's field of view 140. In this way, the camera unit's 104 field of view may track the wearer's field of view 140. A third speaker 130 is not captured by the camera unit 104 in the scene illustrated by FIG. 1 because the third speaker 130 is not presently within the wearer's field of view 140. Digital image(s) and digital video(s) recorded by the camera unit 104 may be stored in a memory of computing system 102.

The camera unit 104 may support capture of image data digitally, in analog, and/or according to any number of lossy or lossless image or video formats, such as Joint Photographic Experts Group (jpeg or jpg), Tagged Image File Format (tiff), Portable Network Graphics (png), Graphics Interchange Format (gif), Moving Picture Experts Group (mpeg, mpeg-2), or any other image or video file format. The camera unit 104 may also support capture image data for various forms of image, such as ultra-violet images, infrared images, night vision, thermal scans, and more.

In the scene illustrated by FIG. 1, the first speaker 110 and the second speaker 120 are positioned within the wearer's field of view 140, while the third speaker 130 is positioned outside of the wearer's field of view 140. Even so, the multi-directional microphone 106 picks up the speech from the first speaker 110, the second speaker 120, and the third speaker 130 who is outside the wearer's field of view 140. The computing system 102 onboard the headset is able to then analyze the speech received by the multi-directional microphone 106 to implement a technical solution that includes displaying captioning text interpreted from the received speech on the display unit 103.

Figure 2:
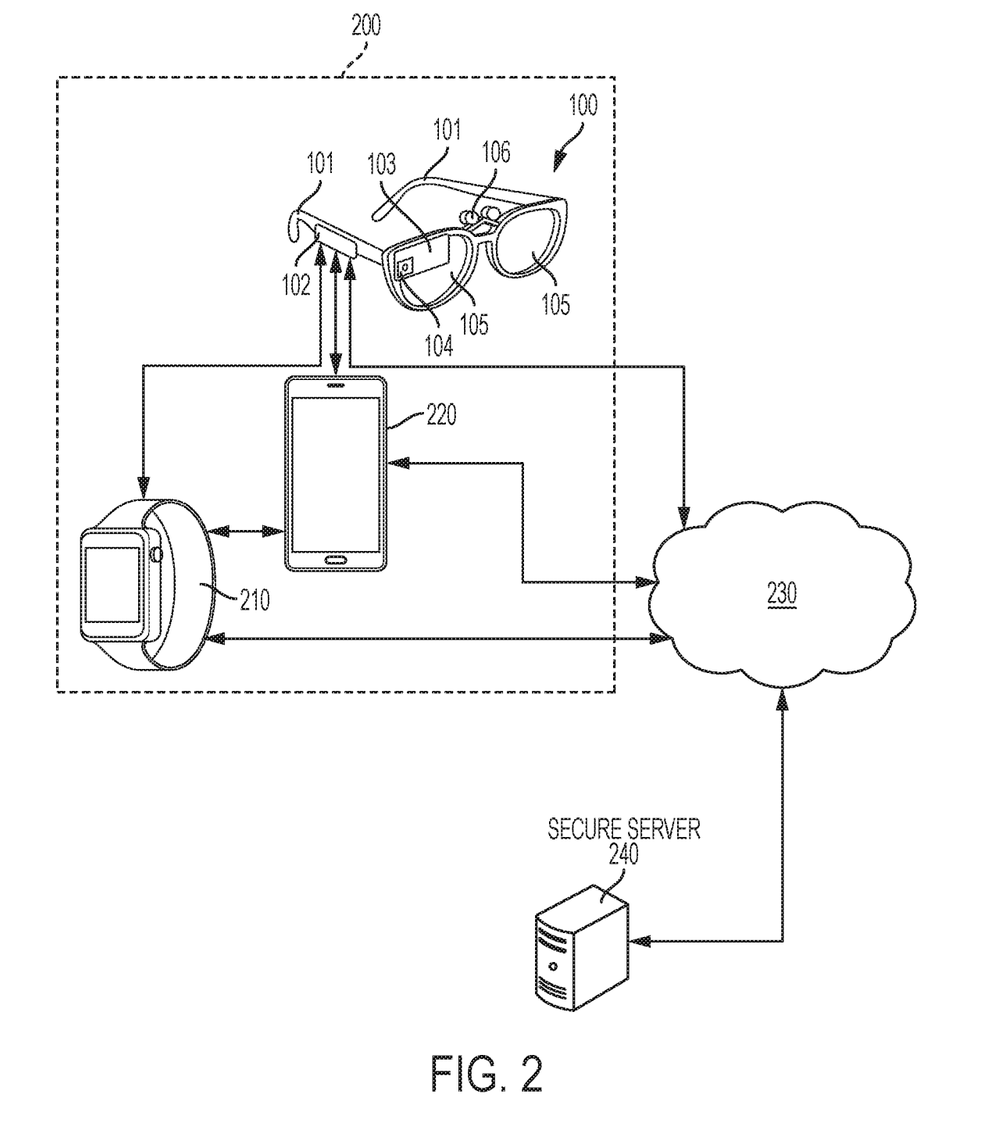
FIG. 2 illustrates an exemplary system of wearable devices and other computer devices, including the wearable device illustrated in FIG. 1.

According to some embodiments, the analysis of the received speech is implemented directly on the computing system 102 onboard the headset. In other embodiments, portions of the speech analysis may be outsourced to other computing device in communication with the headset 100 over a network. For example, FIG. 2 shows a network system 200 where the headset 100 is in wireless communication with other computing devices connected through a network 230. The network system 200 illustrated in FIG. 2 includes the headset 100, a smart watch 210, a smart phone 220, and an offsite server 240. The offsite server 240 may be representative of a single server computer, or a group of server computers that comprise, for example, a neural network computer system or machine learning computer system. Each of the computing devices in the network system 200 communicates with each other either directly, or indirectly via the network 230.

The smart watch 210 supports wireless communication according to known communication protocols such as cellular telecommunication protocols, a Wi-Fi protocol, a Bluetooth protocol, a near frequency communication (NFC) protocol, a radio frequency (RF) protocol, or another like wireless communication protocol. Therefore, communication between devices within the network system 200 may be accomplished according to any number of standard wireless communication protocols.

A more detailed description of the components that may be included on the smart watch 210 is provided below with reference to the computer 600 shown in FIG. 6. When communication between the headset 100 and the smart watch 210 is established, the headset 100 may receive data obtained by the smart watch 210. For example, digital images, digital videos, audio recordings, acceleration information, orientation information, or biometric information obtained by the smart watch 210 may be received by the headset 100 from the smart watch 210. Similarly, data obtained by the headset 100 may be transmitted to the smart watch 210 for processing on the smart watch 210. For example, the speech audio files recorded by the headset 100 may be transmitted to the smart watch 210, and the smart watch 210 may implement analysis on the speech audio files. According to some embodiments, a speaker's speech may be recorded for analysis by the smart watch 210. After the smart watch 210 executes its speech analysis, a result may be transmitted back to the headset 100.

The smart phone 220 supports wireless communication according to known communication protocols such as cellular telecommunication protocols, a Wi-Fi protocol, a Bluetooth protocol, a near frequency communication (NFC) protocol, or another like wireless communication protocol. A more detailed description of the components that may be included on the smart phone 220 is provided below with reference to the computer 600 shown in FIG. 6. When communication between the headset 100 and the smart phone 220 is established, the headset 100 may receive data obtained by the smart phone 220. For example, digital images, digital videos, audio recordings, acceleration information, orientation information, or biometric information obtained by the smart phone 220 may be received by the headset 100 from the smart phone 220. Similarly, data obtained by the headset 100 may be transmitted to the smart phone 220 for processing on the smart phone 220. For example, the speech audio files recorded by the headset 100 may be transmitted to the smart phone 220, and the smart phone 220 may implement analysis on the speech audio files. According to some embodiments, a speaker's speech may be recorded, at least in part, for analysis by the smart watch 210. After the smart phone 220 executes its speech analysis, a result may be transmitted back to the headset 100.

According to some embodiments, at least part of the speech analysis described herein may be executed on the offsite server 240. In these embodiments, the speaker's speech audio files may be recorded by the at least one of the headset 100, the smart watch 210, or the smart phone 220, and the speaker's speech audio files may be uploaded to the offsite server 240 for speech analysis. The offsite server 240 may include the computing resources to conduct natural language processing (NLP) on the received speech audio files. For example, the NLP applied by the offsite server 240 may include machine translation of the received speech audio files to obtain a translation of the speech captured by the received speech audio files into written text. The machine translated text may then be analyzed according to one or more NLP analyses such as text summarization and/or sentiment analysis. The NLP analyses may comprise implementing sentence breaking rules on the machine translated text to break up the text into smaller chunks of text such as paragraphs and individual sentences. The NLP analyses may further comprise tagging parts of speech identifiers (e.g., noun, verb, article, adjective) to the words that comprise a chunk of text. The NLP analyses may further comprise parsing the text to create one or more parsing tree that outline different possible interpretations for a chunk of text. The NLP analyses may further comprise terminology extraction that extracts one or more key terms from a chunk of text to better understand the context of the text. The NLP analyses may further comprise language translation capabilities to translate text from one language to another.

To further assist in the NLP analyses, the offsite server 240 may include, or have access to, databases of relational information. The relational information may take the form of knowledge graphs that correlate relational information to specific keyword entities or topics. For example, for a particular song the corresponding knowledge graph may include branches identifying the songwriter for the song, the music label for the song, a singer of the song, the release year of the song, a music genre of the song, as well as other information related to the song.

To further assist in the NLP analyses, the offsite server 240 may further include, or have access to, databases of user profiles that include a reference voice file of users. The reference voice files may be used to compare against and match when identifying a speaker's voice in the received speech audio files. The user profiles may also include reference images of users, such as head shots. The reference images may be used to compare against and match when identifying a speaker depicted in a received digital image or video file.

After the offsite server 240 executes its speech analysis, a result may be transmitted back to the headset 100. The components of the secure server 240 may include one or more components described in the computer 600 illustrated in FIG. 6.

Figure 3:
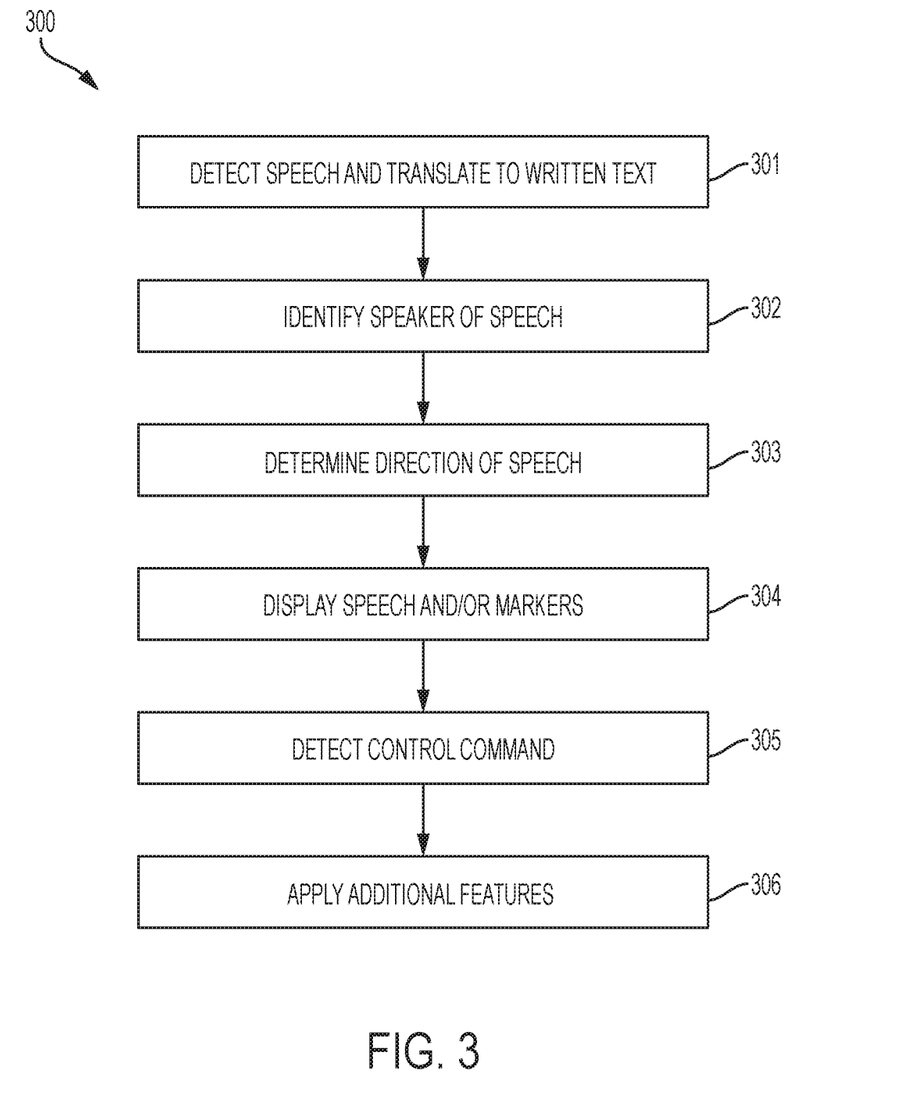
FIG. 3 illustrates a flow diagram describing a process implemented by the wearable device illustrated in FIG. 1.

FIG. 3 illustrates a flow diagram 300 of logic describing a process for analyzing a speech audio recording, and generating an augmented reality view that includes captioned text interpreted from the speech audio recording. The logic of the flow diagram 300 may be included in a speech recognition application running on, for example, the headset 100. According to some embodiments, parts of the speech recognition application may be run on another computing device in communication with the headset 100.

Audible speech spoken by one or more speakers is detected and analyzed into written text by the speech recognition application (301). For example, the multi-directional microphone 106 picks up speech from the first speaker 110, the second speaker 120, and the third speaker 130, and records the speech into a speech audio file stored on a memory of the headset 100. The speech audio file is then translated into written text according to a speech recognition algorithm provided by the speech recognition application. In addition to known speech recognition algorithms that may be applied on the speech audio file, the speech recognition application may supplement the results by tracking the lip movements of the speakers within the wearer's field of view 140. This lip reading feature of the speech recognition application relies on image recognition techniques that match lip movements to known sounds that are produced by such lip movements. The lip reading feature may be used alone, or to supplement the audible speech recognition results from the speech recognition algorithms applied to the speech audio file.

The speech recognition application further isolates and identifies each speaker from the speech audio file (302). The speech recognition application identifies each speaker that has spoken in the speech audio file by isolating each unique voice detected from the speech audio file into their own speaker profile. The speaker profile may be extracted from the speech audio file, and isolate speech from a single speaker. Then, each speaker profile may be compared against a library of known speaker profiles. The library of known speaker profiles includes one or more known speaker profiles that maps characteristics of a known speaker's voice for later comparison purposes. If the speech recognition application matches a speaker profile extracted from the speech audio file with a known audio profile from the library of known speakers, the speech recognition application associates the speaker profile with the known audio profile and the known speaker corresponding to the known audio profile. This way, the identity of a speaker included in the speech audio file may be determined. The library of known speaker profiles may be stored on the headset 100, or on another computing device such as the offsite server 240. In addition or alternatively, the speech recognition application may run facial recognition on the speakers within the wearer's field of view 140 to identify the speakers.

The speech recognition application further determines a direction from which each speaker identified from the speech audio file is positioned relative to the wearer of the headset (303). To predict the direction of the speech, the speech recognition application analyzes audio characteristics for each speaker profile extracted from the speech audio file. For example, a difference in the amplitude of a speech attributed to a same speaker from different audio signals picked up by the plurality of microphones included in the multi-directional microphone 106 may be compared to predict a direction from which the speech originates.

Figure 4:
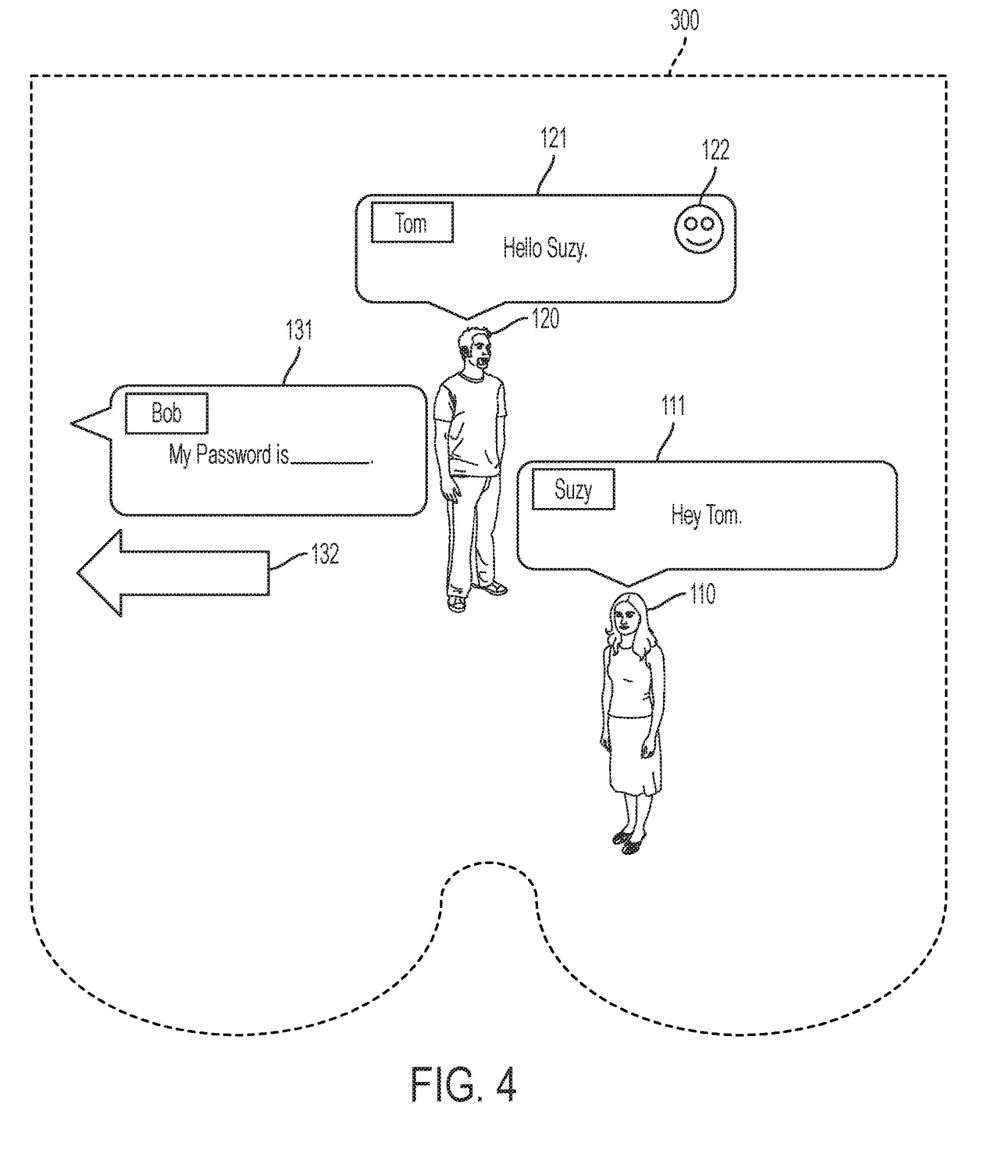
FIG. 4 illustrates an exemplary graphical user interface view provided by the wearable device illustrated in FIG. 1.

The speech recognition application displays the translated speech as written text into an augmented reality graphical user interface (ARGUI) (304). The ARGUI may be superimposed onto the field of view 140 of the wearer. For example, FIG. 4 illustrates an exemplary ARGUI 400 that is viewable by the wearer of the headset 100. The ARGUI 400 includes the first speaker 110 and the second speaker 120, who are both physical objects within the wearer's field of view 140. The ARGUI 400 also includes a first text caption 111, a second text caption 121, and a third text caption 131 that are all virtual objects (i.e., not physical objects) that are displayed on the display unit 103 to superimpose virtual objects within the wearer's field of view 140. The ARGUI 400 further includes a directional marker 132, which is another virtual object displayed on the display unit 103.

The first text caption 111 is displayed above the first speaker 110 to indicate the speech included in the first text caption 111 (e.g., "Hey Tom") has been determined to be attributed to the first speaker 110. The first text caption 111 also identifies the first speaker 110 as Suzy based on the speaker identification process implemented earlier. The second text caption 121 is displayed above the second speaker 120 to indicate the speech included in the second text caption 121 (e.g., "Hello Suzy") has been determined to be attributed to the second speaker 120. The second text caption 121 also identifies the second speaker 120 as Tom based on the speaker identification process implemented earlier. The third text caption 131 is displayed to indicate the speech included in the third text caption 131 (e.g., "My password is ________") has been determined to be attributed to the third speaker 130. The third text caption 131 also identifies the first speaker 110 as Bob based on the speaker identification process implemented earlier. Because the third speaker 130 is not within the wearer's field of view 140, the speech recognition application controls the ARGUI 400 to further display the directional marker 132 to indicate the third speaker 130 is positioned further to the left of the wearer.

Figure 7:
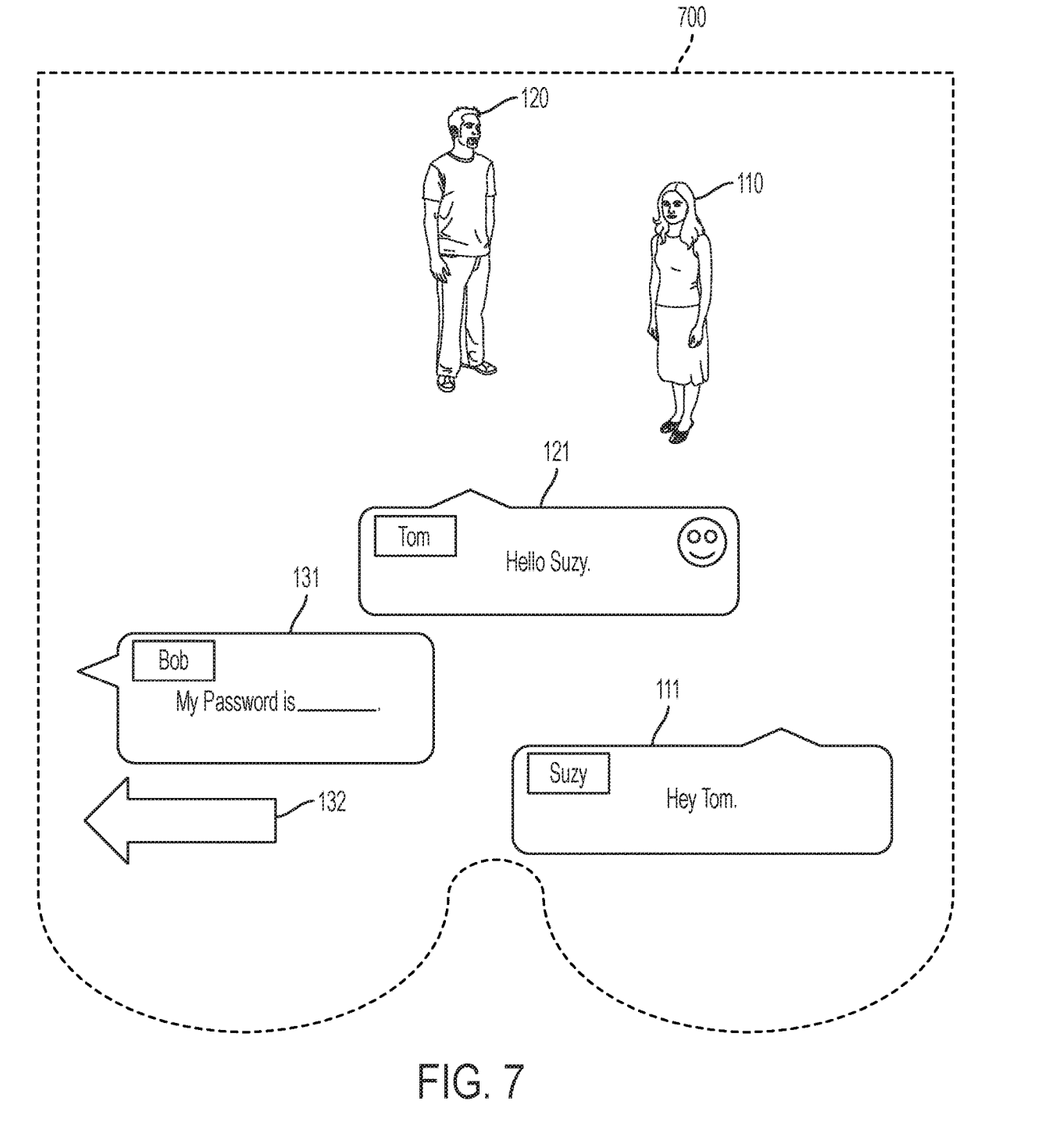
FIG. 7 illustrates an exemplary alternative graphical user interface view provided by the wearable device illustrated in FIG. 1.

FIG. 7 shows an alternative ARGUI 700 where each text caption is displayed in a stacked arrangement, where earlier spoken speech is included in lower text captions. So in the alternative ARGUI 700, the first speaker's 110 speech is included in the lowest stack positioned first text caption 111 to indicate the first speaker 110 was the first to speak. The first speaker 110 is also identified as being Suzy in the first text caption 111, and while not illustrated, the first text caption may be color-coded to distinguish the first text caption 111 from the second text caption 121 and the third text caption 131. The third speaker's 130 speech is included in the middle stack positioned third text caption 131 to indicate the third speaker 130 was the second to speak. The third speaker 130 is also identified as being Bob in the third text caption 131, and while not illustrated, the third text caption may be color-coded to distinguish the third text caption 131 from the second text caption 121 and the first text caption 111. The second speaker's 120 speech is included in the top stack positioned second text caption 121 to indicate the second speaker 120 was the last to speak. The second speaker 120 is also identified as being Tom in the second text caption 121, and while not illustrated, the second text caption may be color-coded to distinguish the second text caption 121 from the third text caption 131 and the first text caption 111.

Figure 5:
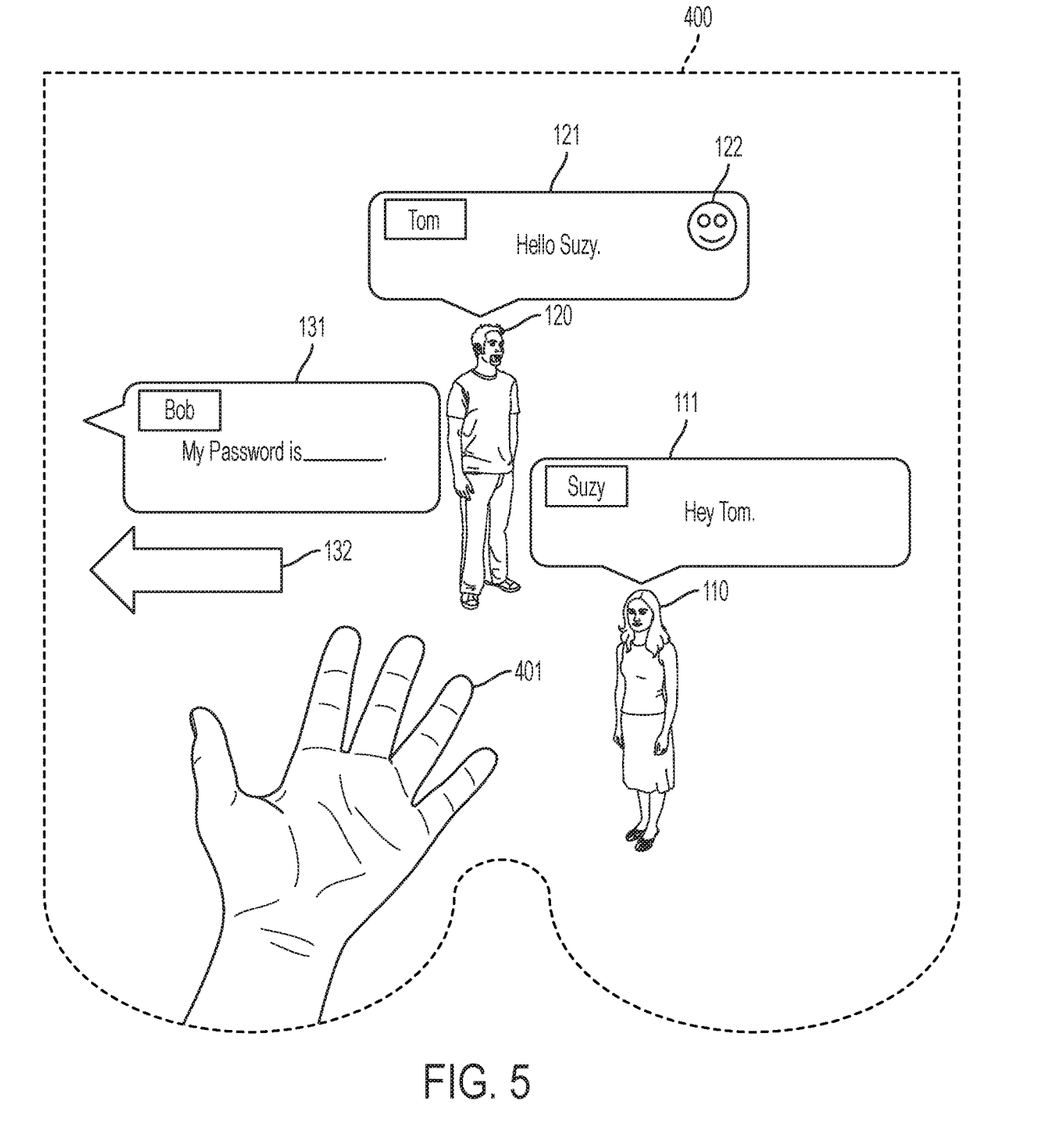
FIG. 5 illustrates an exemplary graphical user interface view for detecting a gesture control command provided by the wearable device in FIG. 1.

Referring back to the flow diagram 300, the speech recognition application may further detect control commands provided by the wearer (305). The control commands may be a voice activated control command, a physical input applied to the headset 100 (e.g., push button, scroll wheel, or touch pad), or a gesture activated control command. An exemplary gesture-activated control command is illustrated by the exemplary ARGUI 500 in FIG. 5 that includes the wearer's gesture control command 401 provided by the wearer's hand movement. The ARGUI 500 includes the same physical and virtual components as the ARGUI 400, with the addition of the wearer's gesture control command 401 provided by the wearer's hand movement. The speech recognition application implements the corresponding operation based on the detected control command.

The speech recognition application may further apply additional features (306). The additional features may be prompted by the detected control commands, or not. For example, to further distinguish each speaker, the ARGUI 400 may color code, or include another distinguishable identifying mark, for each respective text caption that is determined to correspond to a recognized speaker. The speech recognition application may also translate the written text displayed in the text captions into a language that is not the same language as the corresponding speech. So speech in English, may be translated into Chinese for the corresponding written text included in the corresponding test caption.

The speech recognition application may also recognize sensitive information in a speaker's speech, and intentionally exclude the sensitive information when displaying the translated written text in the corresponding text caption. For example, the third text caption 131 in ARGUI 400 recites "My Password is ________" The speech recognition application recognizes the password as sensitive information, and intentionally excludes it from the translated written text in the corresponding third text caption 131. To unlock the sensitive information for display, the wearer may be prompted to input an authentication code (e.g., input password or speak an audible password) or pass another authentication protocol (e.g., biometric fingerprint authentication on a touchpad installed on the headset 100).

The speech recognition application may also track a speaker's facial expressions, intonations in the speaker's speech, and/or changes in amplitude (i.e., volume) of the speaker's speech to predict the speaker's emotions. The speaker's predicted emotion may also be displayed on the display unit 103 to be part of the ARGUI 400. For example, the second text caption 121 in the ARGUI 400 includes an emotion indicator 122 in the form of a smiley face to indicate the speech recognition application is predicting the second speaker 120 is in a good mood. The emotion indicator 122 may take on other forms to indicate other corresponding speaker emotions that are predicted based on an analysis of the speaker's facial expressions, body language, and/or speech characteristics while the speaker is speaking. For example, the emotion indicator 122 may be in the form of an excited face to indicate the second speaker 120 is in an excited mood, the emotion indicator 122 may be in the form of a calm face to indicate the second speaker 120 is in a calm state, the emotion indicator 122 may be in the form of an angry face to indicate the second speaker 120 is in an angry mood, or other similar form of the emotion indicator 122 to reflect a corresponding mood or emotional state.

Figure 6:
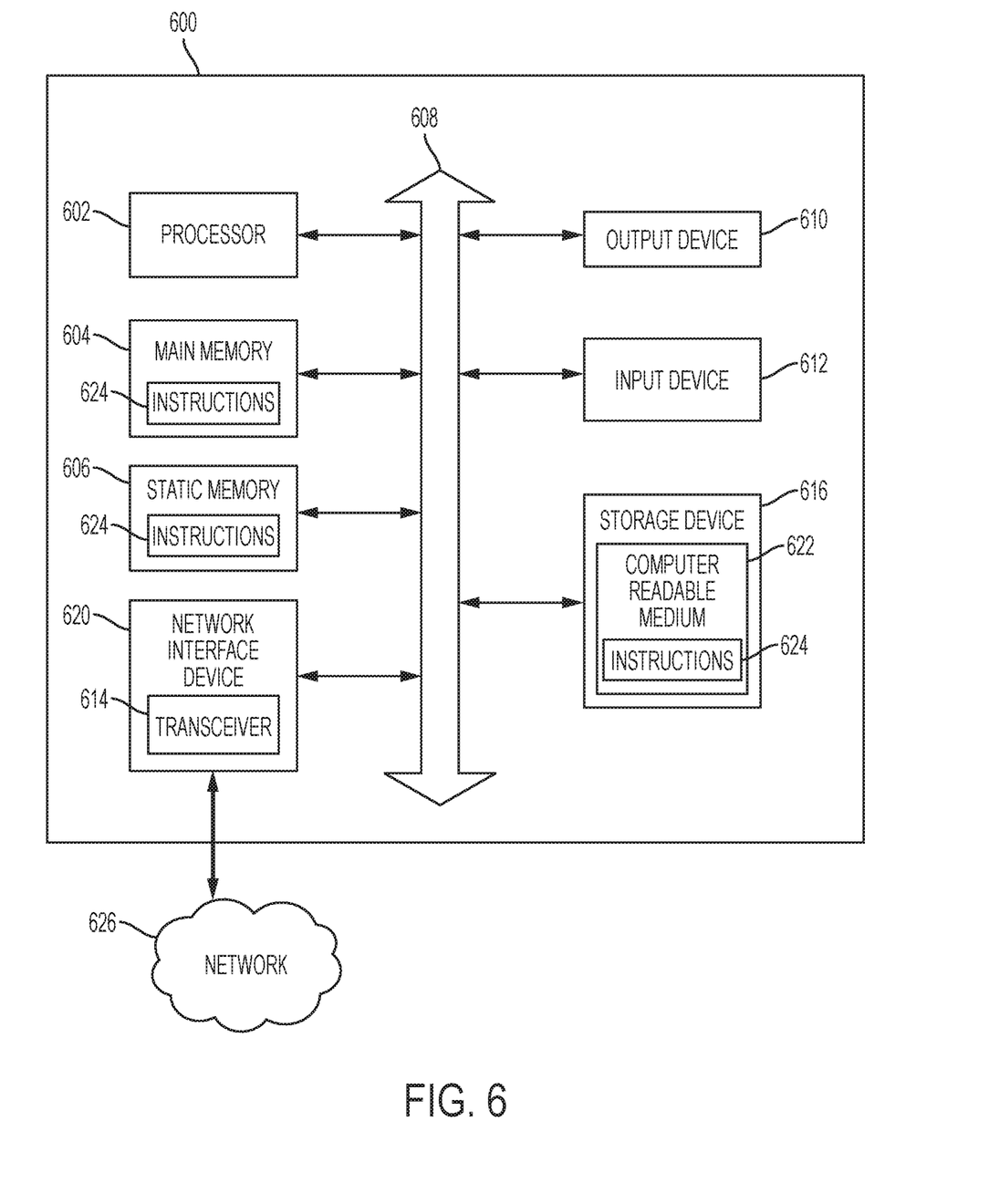
FIG. 6 illustrates a block diagram of an exemplary computer architecture for any of the devices included in the system illustrated in FIG. 2.

Referring to FIG. 6, a block diagram is illustrated of an exemplary computer 600 configured to have an exemplary computer architecture in which embodiments and aspects of the computing devices described herein may be implemented. This computer 600 is one example of a suitable computer architecture and is not intended to suggest any limitation as to the scope of use or functionality. Numerous other general purpose or special purpose computer architectures or configurations may be used. Examples of well-known computing systems, environments, and/or configurations that may be suitable for use include, but are not limited to, smart phones, tablet computers, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a processor or other computing capability on one or more of the computing devices illustrated in the network system of FIG. 2 may be used to implement the features described herein. Generally, program modules include routines, programs, objects, components, data structures, etc. that perform particular tasks or implement particular data types. Distributed computing environments may be used where tasks are performed by remote processing devices that are linked through a communications network or other data transmission medium. In a distributed computing environment, program modules and other data may be located in both local and remote computer storage media including memory storage devices.

The computer 600 includes a network interface 620 operating to provide communication with other computers via a network 626, where network 626 may be represented by network 230 in FIG. 2. The computer 600 may include a processor 602, a main memory 604, a static memory 606, the network interface device 620, an output device 610 (e.g., a display or speaker), an input device 612, and a storage device 616, all connected via a bus 608.

The processor 602 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 602 executes instructions and includes portions of the computer 600 that control the operation of the entire computer 600. The processor 602 may also represent a controller that organizes data and program storage in memory and transfers data and other information between the various parts of the computer 600.

The processor 602 is configured to receive input data and/or user commands from the input device 612. The input device 612 may be a keyboard, mouse or other pointing device, trackball, scroll, button, touchpad, touch screen, keypad, microphone, speech recognition device, video recognition device, or any other appropriate mechanism for the user to input data to the computer 600 and control operation of the computer 600 and/or operation of the speech recognition application described herein. Although only one input device 612 is shown, in another embodiment any number and type of input devices may be included. For example, input device 612 may include an accelerometer, a gyroscope, and a global positioning system (GPS) transceiver.

The processor 602 may also communicate with other computers via the network 626 to receive instructions 624, where the processor may control the storage of such instructions 624 into any one or more of the main memory 604, such as random access memory (RAM), static memory 606, such as read only memory (ROM), and the storage device 616. The processor 602 may then read and execute the instructions 624 from any one or more of the main memory 604, static memory 606, or storage device 616. The instructions 624 may also be stored onto any one or more of the main memory 604, static memory 606, or storage device 616 through other sources. The instructions 624 may correspond to, for example, instructions that make up the speech recognition application described herein.

Although computer 600 is shown to contain only a single processor 602 and a single bus 608, the disclosed embodiment applies equally to computers that may have multiple processors and to computers that may have multiple busses with some or all performing different functions in different ways.

The storage device 616 represents one or more mechanisms for storing data. For example, the storage device 616 may include a computer readable medium 622 such as read-only memory (ROM), RAM, non-volatile storage media, optical storage media, flash memory devices, and/or other machine-readable media. In other embodiments, any appropriate type of storage device may be used. Although only one storage device 616 is shown, multiple storage devices and multiple types of storage devices may be present. Further, although the computer 600 is drawn to contain the storage device 616, it may be distributed across other computers, for example on a server (e.g., the offsite server 240).

The storage device 616 may include a controller and a computer readable medium 622 having instructions 624 capable of being executed by the processor 602 to carry out the functions as previously described herein with reference to the speech recognition application. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. The storage device 616 may also contain additional software and data (not shown), which is not necessary to understand the other features.

Output device 610 is configured to present information to the user. For example, the output device 610 may be a display such as a liquid crystal display (LCD), a gas or plasma-based flat-panel display, or a traditional cathode-ray tube (CRT) display or other well-known type of display in the art of computer hardware. Accordingly, in some embodiments the output device 610 displays a user interface. In other embodiments, the output device 610 may be a speaker configured to output audible information to the user. In still other embodiments, any combination of output devices may be represented by the output device 610.

Network interface device 620 provides the computer 600 with connectivity to the network 626 through any suitable communications protocol. The network interface device 620 sends and/or receives data from the network 626 via a wireless or wired transceiver 614. The transceiver 614 may be a cellular frequency, radio frequency (RF), infrared (IR) or any of a number of known wireless or wired transmission systems capable of communicating with a network 626 or other computer device having some or all of the features of computer 600. Bus 608 may represent one or more busses, e.g., USB, PCI, ISA (Industry Standard Architecture), X-Bus, EISA (Extended Industry Standard Architecture), or any other appropriate bus and/or bridge (also called a bus controller).

Computer 600 may be implemented using any suitable hardware and/or software, such as a personal computer or other electronic computing device. In addition to the various types of wearable devices described herein, computer 600 may also be a portable computer, laptop, tablet or notebook computer, PDA, pocket computer, appliance, telephone, or mainframe computer. Network 626 may be any suitable network and may support any appropriate protocol suitable for communication to the computer 600. In an embodiment, network 626 may support wireless communications. In another embodiment, network 626 may support hard-wired communications, such as a telephone line or cable. In another embodiment, network 626 may support the Ethernet IEEE (Institute of Electrical and Electronics Engineers) 802.3x specification. In another embodiment, network 626 may be the Internet and may support IP (Internet Protocol). In another embodiment, network 626 may be a LAN or a WAN. In another embodiment, network 626 may be a hotspot service provider network. In another embodiment, network 626 may be an intranet. In another embodiment, network 626 may be a GPRS (General Packet Radio Service) network. In another embodiment, network 626 may be any appropriate cellular data network or cell-based radio network technology. In another embodiment, network 626 may be an IEEE 802.11 wireless network. In still another embodiment, network 626 may be any suitable network or combination of networks. Although one network 626 is shown, in other embodiments any number of networks (of the same or different types) may be present.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or use the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to using aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be spread across a plurality of devices. Such devices might include personal computers, network servers, and handheld devices, for example.

What is claimed is:

1. A wearable headset apparatus comprising:
a memory configured to store an audio file corresponding to sound signals obtained by a microphone;
a display screen configured to display an augmented reality graphical user interface (ARGUI), wherein the ARGUI is configured to superimpose information onto the display screen in a field of view of a wearer of the wearable headset;
a processor in communication with the memory, wherein the processor is configured to:
parse the audio file;
identify a speech pattern from the audio file;
determine a speaker corresponding to the speech pattern;
translate the speech pattern into text;
control the display screen to display the text; and
when the speaker is outside the field of view of the wearer of the wearable headset:
determine a relative direction of the speaker; and
control the display screen to display a directional indicator in the ARGUI indicating the relative direction of the speaker to the field of view of the wearer of the wearable headset.

2. The wearable headset apparatus of claim 1, wherein the processor is further configured to:
translate the text into written text of a different language from the speech pattern.

3. The wearable headset apparatus of claim 1, further comprising:
a video recorder configured to record a video file; and
wherein the processor is further configured to:
identify a speaker depicted in the video file;
track lip movements of the speaker;
determine lip reading results based on the tracked lip movements; and
reference the determined lip reading results to supplement the translation of the speech pattern into the text.

4. The wearable headset apparatus of claim 1, further comprising:
a video recorder configured to record a video file; and
wherein the processor is further configured to:
identify a speaker depicted in the video file;
determine a facial expression of the speaker;
determine an emotion related to the determined facial expression; and
control the display screen to display an emotion indicator corresponding to the determined emotion.

5. The wearable headset apparatus of claim 1, further comprising:
a video recorder configured to record a video file; and
wherein the processor is further configured to:
identify a gesture command depicted in the video file;
determine a control command related to the identified gesture command; and
implement the determined control command.

6. The wearable headset of claim 1, wherein the processor is further configured to:
identify a mood of the speaker based on the audio file; and
display a mood graphic corresponding to the identified mood on the display adjacent the text displayed for the speaker.

7. A method of enhancing speech comprehension for a user wearing an augmented reality headset, the method comprising:
receiving a first speech pattern detected by a microphone;
storing, on a memory, the first speech pattern into an audio file;
identifying the first speech pattern from the audio file;
relating the first speech pattern to a first speaker;
translating the first speech pattern to first text;
displaying, on a display screen of the augmented reality headset, the first text;
displaying, on the display screen of the augmented reality headset, a first identifier corresponding to the first speaker; and
when the first speaker is outside a field of view of the user wearing the augmented reality headset:
determine a relative direction of the first speaker to the field of view of the user wearing the augmented reality headset; and
control the display screen to display a directional indicator indicating the relative direction of the first speaker to the field of view.

8. The method of claim 7, further comprising:
receiving a second speech pattern detected by the microphone;
storing, on the memory, the second speech pattern into the audio file;
identifying the second speech pattern from the audio file;
relating the second speech pattern to a second speaker;
translating the second speech pattern to second text;
displaying, on the display screen of the augmented reality headset, the second text and the first text; and
displaying, on the display screen of the augmented reality headset, a second identifier corresponding to the second speaker.

9. The method of claim 7, further comprising:
translating the first text into written text of a different language from the first speech pattern.

10. The method of claim 7, further comprising:
identifying a gesture command depicted within a field of view of the display screen;
determining a control command related to the identified gesture command; and
implementing the determined control command.

11. The method of claim 7, further comprising:
identifying the first speaker depicted within a field of view of the display screen;
determining a facial expression of the first speaker;
determining an emotion related to the determined facial expression; and
controlling the display screen to display an emotion indicator corresponding to the determined emotion.

12. The method of claim 7, further comprising:
identifying a mood of the speaker based on the audio file; and
superimposing, adjacent the text displayed for the speaker, a mood graphic in the field of view of the user wearing the augmented reality headset corresponding to the mood identified for the speaker.

13. A product comprising:
a non-transitory machine readable medium; and
instructions stored on the machine readable medium, the instructions configured to, when executed by a processor, cause the processor to:
store an audio file on a memory, wherein the audio file corresponds to sound signals obtained by a microphone;
control a display screen on a wearable headset to display an augmented reality graphical user interface (ARGUI) superimposed over a field of view of a wearer of the wearable headset;
parse the audio file;
identify a speech pattern from the audio file;
determine a speaker corresponding to the speech pattern;
translate the speech pattern into text;
control the display screen to display the text; and
when the speaker is outside a field of view of the wearer of the wearable headset:
determine a relative direction of the speaker to the field of view; and
control the display screen to display a directional indicator via the ARGUI indicating the relative direction of the speaker to the field of view.

14. The product of claim 13, wherein the instructions are further configured to, when executed by the processor, cause the processor to:
translate the text into written text of a different language from the speech pattern.

15. The product of claim 13, wherein the instructions are further configured to, when executed by the processor, cause the processor to:
control a video recorder to record a video file;
identify a speaker depicted in the video file;
track lip movements of the speaker;
determine lip reading results based on the tracked lip movements; and
reference the determined lip reading results to supplement the translation of the speech pattern into the text.

16. The product of claim 13, wherein the instructions are further configured to, when executed by the processor, cause the processor to:
control a video recorder to record a video file;
identify a speaker depicted in the video file;
determine a facial expression of the speaker;
determine an emotion related to the determined facial expression; and
control the display screen to display an emotion indicator corresponding to the determined emotion.

17. The product of claim 13, wherein the instructions are further configured to, when executed by the processor, cause the processor to:
control a video recorder to record a video file;
identify a gesture command depicted in the video file;
determine a control command related to the identified gesture command; and
implement the determined control command.

18. The product of claim 13, wherein the instructions are further configured to, when executed by the processor, cause the processor to:
identify a second speech pattern from the audio file;
determine a second speaker corresponding to the second speech pattern;
translate the second speech pattern into second text; and
control the display screen to display the second text concurrently with the text.

19. The product of claim 18, wherein the instructions are further configured to, when executed by the processor, cause the processor to:
control the display screen to display a first identifier corresponding to the speaker and display a second identifier corresponding to the second speaker.

20. The product of claim 13, wherein the instructions are further configured to, when executed by the processor, cause the processor to:
identify a mood of the speaker based on the audio file; and
display a mood graphic corresponding to the identified mood on the display adjacent the text displayed for the speaker.

* * * * *